Feb. 4, 1947. G. F. HURST 2,415,285
DIVERTER VALVE
Filed Sept. 23, 1942
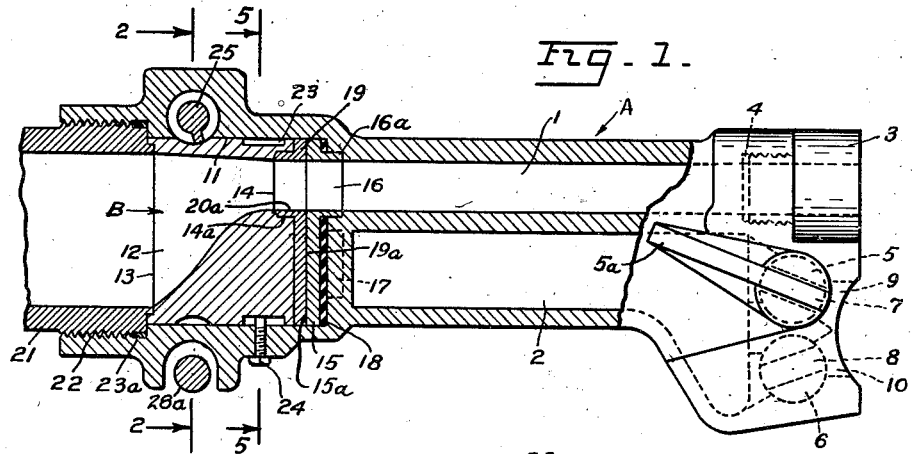
Fig. 1.
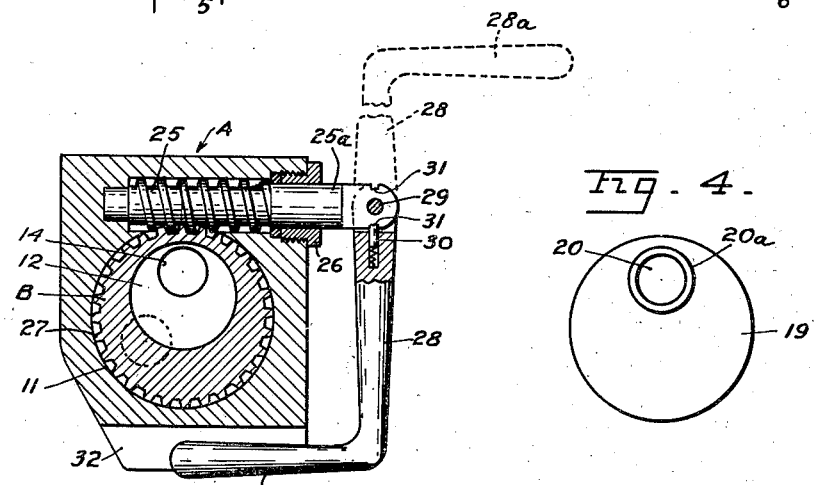
Fig. 2.
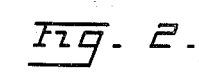
Fig. 3.
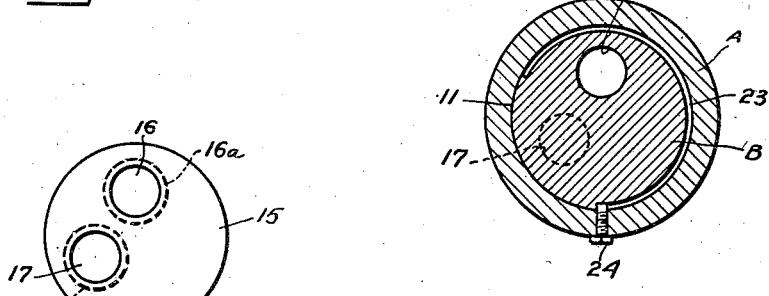
Fig. 4.
Fig. 5.
INVENTOR.
GORDON F. HURST
BY
Munn, Liddy & Glascum
ATTORNEYS Patented Feb. 4, 1947

2,415,285

UNITED STATES PATENT OFFICE 2,415,285

DIVERTER VALVE

Gordon F. Hurst, Burlingame, Calif.

Application September 23, 1942, Serial No. 459,457

2 Claims. (Cl. 251—84)

The present invention relates to improvements in a diverter valve and it consists of the combinations, constructions and arrangements hereinafter described and claimed.

This application is a continuation in part of my copending application on a Fire fighting nozzle, Serial No. 390,948, filed April 29, 1941. In the copending case I show a fire fighting nozzle with a straight stream passage and a fog producing passage. A diverter valve is used for directing the fluid either into the straight stream passage or the spray producing passage. In the copending case the claims are directed to the fog producing mechanism while in the present case I will describe and claim the diverter valve.

The valve is designed to operate under high liquid pressure such as five hundred pounds to the square inch or even higher. The valve can function properly under lower pressures as well. The valve is designed to offer negligible resistance to the fluid as it flows therethrough. The valve may be turned for directing the fluid into the desired passageway, and the mechanism for turning the valve is such as to cause the valve to open and close slowly. This eliminates hydraulic shock caused by the abrupt closing of the valve which creates enormous pressures which must be absorbed by the hose, fittings, pumps, valves, etc.

The passage in the diverter valve aligns with either the straight stream passage or the fog producing passage depending in which position the valve is in, with the result that there is a minimum pressure drop in either the fog or straight stream position. The valve passageways and the diverter valve body are designed to reduce the turbulence in the fluid passing through the nozzle.

Another advantage of the valve lies in the novel means for sealing the valve body against leakage while permitting it to be rotated freely. The valve body may be quickly removed from the valve casing for repair or renewal in case either is necessary. The device is extremely simple in construction and is durable and efficient for the purpose intended.

Other objects and advantages will appear in the following specification, and the novel features of the device will be particularly pointed out in the oppended claims.

My invention is illustrated in the accompanying drawing forming a part of this application, in which:

Figure 1 is a longitudinal section through the fire fighting nozzle illustrating the diverter valve, the fog producing end of the nozzle being shown in elevation;

Figure 2 is a transverse section through the device taken along the line 2—2 of Figure 1;

Figure 3 is a view of the stationary valve plate looked at from the left of Fig. 1;

Figure 4 is a view of the rotatable valve plate looked at from the left of Fig. 1; and Figure 5 is a transverse section taken along the line 5—5 of Figure 1.

While I have shown only the preferred form of my invention, it should be understood that various changes or modifications may be made within the scope of the appended claims without departing from the spirit of the invention.

In carrying out my invention I provide a fire fighting nozzle indicated generally at A. This nozzle has a straight stream passage 1 and a fog producing passage 2. A removable nozzle tip 3 is threaded into the end of the passage 1 and bears against a rubber gasket 4. The fog producing passage has two valved bodies 5 and 6 provided with transverse openings 7, 8 that place passage 2 in communication with the casing outlet openings 9 and 10. Openings 8, 9 are inclined to cause the two fluid streams passing therethrough and through openings 9, 10 to impinge for producing the fog or spray. The valve bodies may be rotatable for varying the angle of impingement between the two streams.

The present invention pertains to the diverter valve and the valve body is indicated generally at B in Figures 1 and 2. The valve body B is cylindrical in shape and is rotatably mounted in a cylindrical bore 11 formed in the casing A. The bore 11 has one end communicating with the casing passageways 1 and 2. The valve body B has a longitudinally extending passage 12 that has a large entrance end 13 and a small exit end 14. The valve passageway 12 is substantially conical in shape for guiding the fluid that enters the end 13 to the exit end 14 with a minimum of resistance. The exit end 14 may be moved into registration with either of the passageways 1 and 2 or into a position which is midway between the two, at which position the diverter valve is closed.

I will now describe the means for making the connection between the valve body B and the casing A leak proof. A stationary valve plate 15, see Figures 1 and 3, has two openings 16 and 17 that register with the passageways 1 and 2. The plate has circular flanges 16a and 17a aligned with the openings 16 and 17 and these flanges enter recessed portions in the entrance ends of the casing passageways 1 and 2. The inner diameters of the flanges 16a and 17a are aligned with the inner diameters of the passageways 1 and 2. The stationary plate 15 has a rubber washer 18 to make a liquid tight seal between the plate and casing. The face 15a of the plate is ground for making a smooth flat surface for a purpose now to be described.

A rotatable valve plate 19 is shown in Figures 1 and 4. This plate has an opening 20 that registers with the exit end 14 of the valve passage 12. A circular flange 20a is aligned with the opening 20 and enters a recess 14a in the valve passage 12. The inner diameter of the flange 20a is the same as the diameter of the exit end 14. The plate 19 has a ground surface 19a that contacts with the ground surface 15a. The two surfaces make a liquid tight seal therebetween while permitting the valve body B to be rotated readily with respect to the plate 15.

The means for holding the valve body B in place comprises a tail piece 21 that is threaded into a threaded portion 22 of the casing A and is connected to a hose, not shown. A gasket 23a is placed between the tail piece 21 and the valve body for forming a liquid tight seal between the two parts. The tail piece prevents the removal of the valve body from the casing. When the tail piece is removed, the valve body may be removed for the purpose of renewing it or for resurfacing or renewing the plates 15 and 19.

I provide means for limiting the rotation of the valve and for stopping it when the end 14 of the passage 12 registers either with the passage 1 or the passage 2. In Figures 1 and 5 I show the valve body provided with a circumferential groove 23 that extends a predetermined distance around the valve body. A set screw 24 is carried by the casing and enters the groove. The set screw serves a double function of holding the valve body against removal when a tail piece is changed and of limiting the rotative movement of the valve body in the casing. The ends of the groove 23 are reached when the exit end 14 is in alignment with either the passage 1 or the passage 2. In Figure 5 I show the groove 23 extending around the circumference of the valve body, and the length of the groove is such that the set screw will abut either groove end when the exit end 14 is in registration with either the passage 1 or the passage 2. The set screw therefore not only limits the rotation of the valve body so that the exit end 14 registers with the passages 1 and 2, but in addition prevents the valve body from being removed from the casing even after the tail piece 21 is removed. The set screw therefore acts as an auxiliary means for holding the valve body against removal from the casing. This is needed when a different sized tail piece is being connected to the valve.

The means for rotating the valve into any one of three positions comprises a worm 25 that is rotatably mounted in the casing A. Figure 2 shows the worm shank 25a as being mounted in a packing gland 26. The worm engages with a worm gear 27 formed on the periphery of the valve body B. A handle 28 is pivotally connected to the worm shank 25a at 29. A spring pressed pin 30 is carried by the handle and is adapted to enter either one of two recesses 31 in the shank 25a. The handle can be swung from inoperative position, which is shown in Figure 2, into operative position, which is shown by the broken lines in the same figure. The spring pressed pin 30 frictionally holds the handle in either position, release of the pin being accomplished by extra manual force applied to the handle in moving it from one position to the other. It will be noted from Figures 1 and 2 that the bottom of the casing has a recess 32 for receiving the hand grip portion 28a of the handle.

The passages 1 and 2 are disposed 120° apart and the neutral or closed position of the valve body is when the exit end is disposed 120° away from both passageways 1 and 2. The gearing ratio between the worm and the worm gear is such that to move the exit end 14 of the valve passage 12 from neutral or closed position into registration with either one of the passages 1 and 2, the handle 28 must be rotated three times, although I do not wish to be confined to any exact number of turns for the handle. For example, the valve handle 28 is rotated three times in a forward direction to move the exit end 14 into registration with the straight stream passage 1. The casing may be marked to indicate in which direction the handle must be rotated to cause the water or other fluid to issue from the nozzle to produce a straight stream or a fog. The three revolutions forward or reverse of the handle will cause the valve passage 12 to be gradually brought into registration with the casing passageways or out of registration therewith. This prevents the abrupt closing of the valve and high fluid pressures can be handled without undue hydraulic shock due to the too sudden closing of the valve body.

From the foregoing description of the various parts of the device, the operation thereof may be readily understood.

The operator can connect either fluid passage 1 or 2 with the valve passage exit end 14 by rotating the valve in the manner described. The actual rotative movement between the valve and the casing occurs between the plates 15 and 19. The contacting surfaces of the two plates are metal and provide a liquid tight seal. The greater the pressure of the fluid in the hose and nozzle, the greater the sealing effect of the valve because the conical passage 12 produces a thrust on the valve body B and plate 19 that moves the plate into closer contact with the plate 15. The rotation of the valve is easy regardless of the fluid pressure because the flat metal contact between the two plates consists of two ground surfaces 15a and 19a and the rotation of the valve body is effected by a worm and worm screw mechanism. The flanges on the plates guide the water or other fluid from the valve passage 12 into either casing passage 1 or 2. The flanges 20a, 16a and 17a provide a continuous fluid passage that will prevent the fluid from leaking between the valve parts. The slow moving of the valve body B prevents hydraulic shock when the valve is closed.

The nozzle tip 3 can be changed for altering the size of the stream that issues from the straight stream passage. When the fluid is directed into the fog stream passage, the fog producing valves 5 and 6 may be rotated into a position to create a fog of the desired type. This feature is set forth in detail in the copending case and needs no further description. The gaskets 4 and 23 and the washer 18 may be made of synthetic rubber. The worm and worm gear drive between the handle and the valve body permit an easy operation of the valve even at high fluid pressures. The worm locks the valve body against accidental rotation. The handle swings into an out of way position when not in use.

One of the principal if not the most outstanding features of this particular valve is the direct flow of water or fluid either through the fog producing channel or the straight stream channel. This is caused by the diverted valve body passage extending parallel to both the straight stream and fog producing passages or channels. The result of such a structure produces a nozzle having an effective straight stream or fog with a minimum of pressure drop in the fog position. In designing the nozzle disclosed in this case and in my companion case, I had the point in mind of obviating the turbulence incident to the other manufactured nozzles when they produced a fog for it is the turbulence that causes the drop in fluid pressure and friction.

I claim:

1. A diverter valve comprising a casing having a plurality of outlet passageways leading from an end of a cylindrical bore, a valve body rotatably mounted in the bore and having a longitudinal passageway adapted to be brought into registration with any one of the desired casing passageways, a stationary plate placed in the bore and having flanged openings communicating with the casing passageways, a rotatable plate bearing against the stationary plate and having a flanged opening communicating with the valve body passageway, the abutting surfaces of the plates being ground to provide a liquid tight seal, and means for rotating the valve body and rotatable plate as a unit.

2. A diverter valve comprising a casing having a plurality of outlet passageways leading from an end of a cylindrical bore, a valve body rotatably mounted in the bore and having a longitudinal passageway adapted to be brought into registration with any one of the desired casing passageways, a rotatable plate at one end of said body formed with an opening communicating with said passageway, means securing said rotatable plate to said body for rotation therewith, a stationary plate placed in the bore and having flanged openings communicating with the opening in said rotatable plate, said rotatable plate and said stationary plate being in abutting relation to each other and having abutting surfaces ground to provide a liquid tight seal, means for rotating the valve body and rotatable plate as a unit, and a washer placed between the stationary plate and the end wall of the bore.

GORDON F. HURST.

REFERENCES CITED

The following references are of record in the file of this patent:

UNITED STATES PATENTS

| Number | Name | Date |
|---|---|---|
| 695,963 | Studer | Mar. 25, 1902 |
| 1,487,762 | Spuhr | Mar. 25, 1924 |
| 1,732,608 | Lehnert | Oct. 22, 1929 |
| 1,569,285 | Katona | Jan. 12, 1926 |
| 1,458,203 | Tanner | June 12, 1923 |
| 555,573 | Haas | Mar. 3, 1896 |
| 265,573 | Callahan | Oct. 10, 1882 |
| 192,880 | Ryon | July 10, 1887 |
| 170,138 | Westland | Nov. 16, 1876 |
| 1,968,391 | Hamilton | July 31, 1934 |

FOREIGN PATENTS

| Number | Country | Date |
|---|---|---|
| 780,692 | French | Feb. 4, 1935 |